United States Patent Office 2,859,211
Patented Nov. 4, 1958

2,859,211

1,2-DIARYL-1,2-DIAZA CYCLOBUTANONE-3-CARBOXYLIC ACID DERIVATIVES

Rudolf Pfister and Franz Häfliger, Basel, Switzerland, assignors to Geigy Chemical Corporation, New York, N. Y., a corporation of Delaware No Drawing. Application July 8, 1957
Serial No. 670,388

Claims priority, application Switzerland August 2, 1956

5 Claims. (Cl. 260—239)

The present invention concerns a new process for the production of diazacyclobutane compounds. It also concerns the new compounds which have valuable pharmacological properties which are obtainable according to this process.

Surprisingly it has now been found that diazacyclobutanone carboxylic acids (diazetidone carboxylic acids) of the general formula:

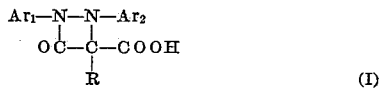

wherein Ar$_1$ and Ar$_2$ represent phenyl radicals which can be substituted by low molecular alkyl or alkoxy groups or halogen atoms, and R represents a hydrocarbon radical containing a polyvalent linking member selected from the group consisting of

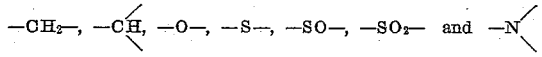

and the salts thereof can be produced in a simple manner by reacting, advantageously in aqueous solution, a salt, in particular an alkali salt, of a 4-substituted 1.2-diaryl-3.5-dioxo-pyrazolidine of the general formula:

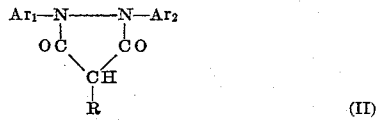

with a salt of a hypohalous acid or with a substance or mixture of substances giving off such, if necessary separating the free acid of the formula I by acidifying and, if desired, converting it into the salts with inorganic or organic bases. A diazacyclobutanone, namely 1.2.3.3-tetraphenyl-1.2-diazacyclobutanone-(4) has been obtained by H. Staudinger by reacting diphenylketene with azobenzene, but it could in no way have been foreseen that by a completely different, simple reaction, carboxyl substituted diazacyclobutanones could be obtained. The compounds obtainable according to the present invention have excellent antiphlogistic as well as antipyretic and analgetic activity and, for example as such or in the form of their alkali salts, they can be applied perorally or parenterally for the treatment of rheumatic affections.

Starting materials of the general Formula II are already known to a great extent and can be produced for example by condensing monosubstituted malonic acid dialkyl esters with hydrazobenzene or with hydrazobenzenes substituted according to the definition of Ar$_1$ and Ar$_2$. The condensation is performed by means of alkali alcoholates. Examples of suitable starting materials are 4-methyl-, 4-ethyl-, 4-isopropyl-, 4-n-butyl-, 4-isobutyl-, 4-n-amyl-, 4-(β-methyl-pentyl)-, 4-n-hexyl-, 4-n-octyl-, 4-(β-ethyl-hexyl)-, 4-n-dodecyl-, 4-n-octadecyl-, 4-(β-methoxy-ethyl)-, 4-(β-ethoxy-ethyl)-, 4-(β-diethyl-amino-ethyl)-, 4-cyclopentyl-, 4-cyclohexyl-, 4-(2'.5'-endomethylene - cyclohexyl)-, 4 - (2'.5' - endomethylene-cyclohexyl - methyl)-, 4 - benzyl, 4 - (p - chloro - benzyl)-, 4 - (p - methoxy - benzyl)-, 4 - (β - phenyl - ethyl)-, 4-(γ-phenyl-propyl)-, 4 - (β - phenoxy-ethyl)-, 4 - (β - p-chloro-phenoxy-ethyl)-, 4-(β-phenyl-mercapto-ethyl)-, 4-(β-phenyl sulphinyl - ethyl)-, 4 - (β - phenyl - sulphonyl-ethyl)-, 4-(α-picolyl)-, 4-(γ-picolyl)-, 4-(γ-pyridyl-(4')-ethyl)-, 4 - furfuryl-, 4 - tetrahydrofurfuryl-, 4 - (m.p-methylene-dioxy-benzyl)- and 4(β-piperidino-ethyl)-1.2-diphenyl- 3.5-dioxo-pyrazolidine as well as the correspondingly substituted 4-substituted 1.2-bis-(p-methyl-phenyl)-, 1.2-bis-(p-methoxy-phenyl)- and 1.2 - bis - (p - chloro-phenyl)-pyrazolidines. If desired, also the crude solutions of alkali salts, obtained by extraction of the condensation mixture of malonic acid diesters and diaryl hydrazines with water, can be used direct as solutions of the alkali salts of these starting materials.

Suitable salts of the hypohalous acid are, e. g. the sodium and potassium hypochlorite, hypobromite and hypoiodite, the aqueous solutions of which, if desired, can be produced in the known manner just immediately before the reaction by the introduction of chlorine into or by the addition of bromine or iodine to caustic soda lye or caustic potash solution. Instead of such salts or the aqueous solutions thereof, sodium p-toluene-sulpho-chloramine or p-toluene sulphone-N.N-dichloramide or N.N'-dichloro-dimethyl hydantoin respectively can be used, for example, as oxidising agents, i. e. as substances and mixtures of substances giving off a salt of a hypohalous acid, in the presence of alkali lye. However, the use of these substances has no advantages over that of alkali hypohalogenites, indeed in some circumstances it even makes the working up of the oxidation products more difficult.

The reaction is performed advantageously in an aqueous medium which has the advantages over organic solvents such as alcohols, ketones etc. of simplicity and cheapness.

The new carboxylic acids produced according to the present invention can be converted in the usual way into water soluble alkali salts having an almost neutral reaction which can be used for intramuscular or intravenous injection in the treatment of rheumatic affections. However, the new carboxylic acids can also be used as such or in the form of the salts with inorganic or organic bases for the peroral treatment of rheumatic complaints.

The following examples further illustrate the performance of the new process. Parts are given as parts by weight and their relationship to parts by volume is that of grammes to cubic centimetres. The temperatures are in degrees centigrade.

Example 1

154 parts of 1.2-diphenyl-3.5-dioxo-4-n-butyl-pyrazolidine are dissolved in 500 parts by volume of 1N-caustic soda lye. 320 parts by volume of 12% sodium hypochlorite solution are added dropwise while stirring at 0–5°. The whole is stirred for 12 hours at room temperature, 3000 parts by volume of water are added. The reaction mixture is covered with a layer of 1000 parts of ether, the reaction mixture is covered with a layer of 1000 parts of ether, the reaction is made acid to congo red paper with concentrated hydrochloric acid, the ether solution which has separated is washed with water, dried over sodium sulphate and concentrated to about half its volume. About 1000 parts by volume of petroleum ether are then added so that the solution just remains clear, whereupon it is left to stand overnight. 1.2-diphenyl-3-carboxy-3-n-butyl-1.2 - diazacyclobutanone - (4) crystallises out in white prisms which melt at 122°.

1.2-diphenyl-3-carboxy - 3 - isopropyl - 1.2 - diazacyclobutanone-(4), (M. P. 138° from ether/cyclohexane) is obtained in an analogous manner from 15 parts of 1.2-diphenyl-3.5-dioxo-4-isopropyl-pyrazolidine in 110 parts by volume of ½ N-caustic soda lye with 32 parts by volume of 12% sodium hypochlorite solution.

In an analogous manner are obtained:

1.2-diphenyl-3-carboxy-3-n-amyl - 1.2 - diazacyclobutanone-(4) (M. P. 109°) from 16.1 parts of 1.2-diphenyl-3.5-dioxo-4-n-amyl-pyrazolidine in 100 parts by volume of 0.5 N-caustic soda lye and 32 parts by volume of 12% sodium hypochlorite solution;

1.2-diphenyl-3-carboxy-3-cyclopentyl - 1.2 - diazacyclobutanone-(4) (M. P. 137° from cyclohexane), from 14.1 parts of 1.2-diphenyl-3.5-dioxo-4-cyclopentyl-pyrazolidine in 97 parts by a volume of ½ N-caustic soda lye with 23 parts by volume of 15% sodium hypochlorite solution;

1.2-diphenyl-3-carboxy-3-benzyl - 1.2 - diazacyclobutanone-(4) (M. P. 108° from ether/petroleum ether), from 1.2-diphenyl-3.5-dioxo-4-benzyl-pyrazolidine;

1.2-diphenyl-3-carboxy-3 - tetrahydrofurfuryl - 1.2 - diazacyclobutanone-(4) (M. P. 80° dissolved and reprecipitated) from 1.2-diphenyl-3.5-dioxo-4-tetrahydrofurfuryl-pyrazolidine;

1.2-diphenyl-3-carboxy-3-(2'-(γ-pyridyl) - ethyl) - 1.2-diazacyclobutanone-(4) (M. P. 162° from pyridine/acetic acid ester) from 7.14 parts of 1.2-diphenyl-3.5-dioxo-4-(2'-(γ-pyridyl)-ethyl)-pyrazolidine in 200 parts by volume of ⅒ N-caustic soda lye and 11 parts by volume of 12% sodium hypochlorite solution;

1.2-diphenyl-3-carboxy-3-(2'-diethylamino-ethyl) - 1.2-diazacyclobutanone-(4) (M. P. 116° dissolved and reprecipitated) from 1.2-diphenyl-3.5-dioxo - 4 - (2' - diethylamino-ethyl)-pyrazolidine;

1.2-diphenyl-3-carboxy-3-cyclohexyl-1.2 - diazacyclobutanone-(4) from 1.2-diphenyl-3.5-dioxo-4-cyclohexyl-pyrazolidine;

1.2-bis-p-tolyl-3-carboxy-3-n-butyl-1.2 - diazacyclobutanone-(4) from 33.6 parts of 1.2-bis-p-tolyl-3.5-dioxo-4-n-butyl-pyrazolidine;

1.2-diphenyl-3-carboxy-3-cyclohexyl-1.2 - diazacyclobutanone-(4) from 1.2-diphenyl-3.5-dioxo - 4 - cyclohexyl-pyrazolidine;

1.2-bis-(p-methoxy-phenyl)-3-carboxy-3-n - butyl - 1.2-diazacyclobutanone-(4) from 1.2-bis-(p-methoxy-phenyl)-3.5-dioxo-4-n-butyl-pyrazolidine;

1.2-bis-(p-chloro-phenyl)-3-carboxy-3-n-butyl - 1.2 - diazacyclobutanone-(4) from 1.2-bis-(p - chloro - phenyl)-3.5-dioxo-4-n-butyl-pyrazolidine;

1.2-diphenyl-3-carboxy-3-(p - chloro - benzyl) - 1.2 - diazacyclobutanone-(4) from 1.2-diphenyl-3.5-dioxo-4-(p-chloro-benzyl)-pyrazolidine;

1.2-diphenyl-3-carboxy-3-(β - phenylmercapto - ethyl)-1.2-diazacyclobutanone-(4) from 1.2-diphenyl-3.5-dioxo-4-(β-phenylmercapto-ethyl)-pyrazolidine; 1.2-diphenyl-3-carboxy-3-(β-phenylsulphinyl-ethyl)-1.2 - diazacyclobutanone-(4) from 1.2-diphenyl-3.5-dioxo - 4 - (β - phenylsulphinyl-ethyl)-pyrazolidine and 1.2-diphenyl-3-carboxy-3-(β - phenylsulphonyl - ethyl)-1.2-diazacyclobutanone-(4) from 1.2-diphenyl-3.5-dioxo-4-(β-phenylsulphonyl-ethyl)-pyrazolidine.

*Example 2*

A solution of 11.4 parts of sodium p-toluene-sulpho-N-chloramine in 83 parts by volume of water is added dropwise at room temperature to a solution of 15.4 parts of 1.2-diphenyl-3.5-dioxo-4-n-butyl-pyrazolidine in 50 parts by volume of 1 N-caustic soda lye.

The whole is stirred for 12 hours at about 25°, then filtered, the filtrate is made acid to congo red paper with 6 N-hydrochloric acid, the precipitate is taken up in 150 parts by volume of ethyl acetate, washed with water and extracted three times with 100 parts by volume of ½ N-soda solution each time. After acidifying to congo red paper, taking up in ether, washing, drying, evaporating and recrystallising from ether/petroleum ether, 1.2-diphenyl-3-carboxy-3-n - butyl - 1.2 - diazacyclobutanone-(4) is obtained. M. P. 122°.

*Example 3*

A bromine lye prepared from 110 parts by volume of 2 N-caustic soda lye and 5.12 parts by volume of bromine at 5° is added dropwise at 5° to a solution of 30.8 parts of 1.2-diphenyl-3.5-dioxo-4-n-butyl pyrazolidine in 100 parts by volume of N-caustic soda lye. The reaction mixture is stirred for 12 hours at room temperature. Traces of neutral by products are then removed by shaking out with ether. The pH of the aqueous solution is then adjusted to 3 and the oil which precipitates is taken up in ether. The ethereal solution is dried with sodium sulphate and concentrated to a small volume. On the addition of benzene, 1.2-diphenyl-3-carboxy-3-n-butyl-1.2 - diazacyclobutanone - (4) slowly crystallises out. M. P. 122°.

What we claim is:

1. Process for the production of diazacyclobutane derivatives corresponding to the formula:

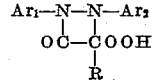

wherein each of $Ar_1$ and $Ar_2$ represents a member selected from the group consisting of phenyl, p-methoxy-phenyl, p-chlorophenyl and p-tolyl, and R represents a member selected from the group consisting of lower alkyl, benzyl, chloro-benzyl, cyclopentyl, cyclohexyl, diethylaminoethyl, phenylmercaptoethyl, phenylsulfinyl, phenylsulfonyl, tetrahydrofurfuryl and γ-pyridyl-ethyl, comprising reacting in aqueous solution a salt of a 1.2-diaryl-3.5-dioxo-pyrazolidine of the general formula:

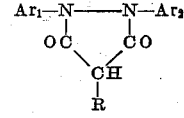

wherein $Ar_1$, $Ar_2$ and R have the meanings defined above, with a member selected from the group consisting of a salt of a hypohalous acid and a substance giving off such, and separating the free acid by acidifying.

2. A member selected from the group consisting of a diazacyclobutane derivative corresponding to the formula:

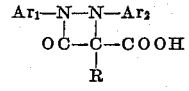

wherein each of $Ar_1$ and $Ar_2$ represents a member selected from the group consisting of phenyl, p-methoxy-phenyl, p-chlorophenyl and p-tolyl, and R represents a member selected from the group consisting of lower alkyl, benzyl, chloro-benzyl, cyclopentyl, cyclohexyl, diethylaminoethyl, phenylmercaptoethyl, phenylsulfinyl, phenylsulfonyl, tetrahydrofurfuryl and γ-pyridyl-ethyl, and the salts thereof.

3. 1.2-diphenyl-3-carboxy-3-n-butyl-1.2 - diazacyclobutanone-(4).

4. 1.2-diphenyl-3-carboxy-3-cyclopentyl - 1.2 - diazacyclobutanone-(4).

5. 1.2-diphenyl-3-carboxy-3-[2' - (γ - pyridyl) - ethyl]-1.2-diazacyclobutanone-(4).

No references cited.